(12) United States Patent
Ofek et al.

(10) Patent No.: US 6,185,661 B1
(45) Date of Patent: Feb. 6, 2001

(54) WORM MAGNETIC STORAGE DEVICE

(75) Inventors: Yuval Ofek, Framingham; Douglas E. LeCrone, Foxborough, both of MA (US)

(73) Assignee: EMC Corporation, Hopkinton, MA (US)

( * ) Notice: Under 35 U.S.C. 154(b), the term of this patent shall be extended for 0 days.

(21) Appl. No.: 09/002,712

(22) Filed: Jan. 2, 1998

(51) Int. Cl.[7] .................................................. G06F 12/00
(52) U.S. Cl. .......................................................... 711/145
(58) Field of Search ................................. 711/144, 145, 711/141, 163, 111, 112, 113

(56) References Cited

U.S. PATENT DOCUMENTS

| | | | |
|---|---|---|---|
| 4,689,778 | 8/1987 | Miura et al. ............................. | 369/32 |
| 4,760,566 | 7/1988 | Kobayashi et al. ................... | 369/100 |
| 4,831,611 | 5/1989 | Sasaki et al. ............................ | 369/58 |
| 4,939,598 | 7/1990 | Kulakowski et al. ................. | 360/48 |
| 5,023,854 | 6/1991 | Satoh et al. ............................. | 369/32 |
| 5,210,845 | * 5/1993 | Crawford et al. .................... | 395/425 |
| 5,218,685 | * 6/1993 | Jones .................................... | 395/425 |
| 5,233,576 | 8/1993 | Curtis et al. ............................ | 369/13 |
| 5,325,504 | * 6/1994 | Tipley et al. .......................... | 395/425 |
| 5,446,857 | * 8/1995 | Russ ...................................... | 395/427 |
| 5,615,353 | * 3/1997 | Lautzenheiser ....................... | 395/463 |
| 5,751,996 | * 5/1998 | Glew et al. ........................... | 711/145 |
| 5,752,264 | * 5/1998 | Blake et al. .......................... | 711/144 |

* cited by examiner

Primary Examiner—Eddie P. Chan
Assistant Examiner—Kevin Verbrugge
(74) Attorney, Agent, or Firm—George A. Herbster; Pearson & Pearson

(57) ABSTRACT

A method for operating a magnetic disk storage device in read/write and read-only modes. A control program in a system cache memory receives write requests for transferring data to a logical volume. The control program determines whether the write request is directed to a track that is in a read/write or read-only operating mode. Only requests to tracks having a read/write operating mode are enabled to continue. A system administrator or user controls the operating modes for each track in the disk operating system.

18 Claims, 5 Drawing Sheets

WORM MAGNETIC STORAGE DEVICE

BACKGROUND OF THE INVENTION

1. Field of the Invention

This invention relates to data storage devices and more particularly to a method for enabling read-write storage media to operate with a write once, read many times characteristic.

2. Description of Related Art

Generally a data processing system operates with a host processor including a main memory and a secondary memory comprising one or more magnetic disk storage devices. The magnetic disk storage devices all have a read/write capability. That is, each storage location in the magnetic disk storage device can be altered many times.

There are some applications in which it is necessary or highly advantageous to provide a permanent, non-alterable version of a file. By non-alterable it is meant that the data in the file can not be altered without leaving some sort of audit trail concerning that change. For example, insurance policies, while being written, are subject to change while they are being negotiated or compiled; once the insurance policy is issued, both the insurance company and policy holder want to be sure any change to that policy is detected. Similar requirements for permanence exist for medical records and images.

Given the ease with which data of this type can be altered on conventional magnetic storage media, a number of applications use optical disks for providing such "permanent" or "non-alterable" storage. These optical disks have a write once, read many times characteristic and are called WORM devices. Examples of such optical storage media are disclosed in U.S. Pat. No. 4,689,778 to Miura et al. for an Optical Disc Recording/Reproducing Apparatus with Recorded Track-Section Detector; U.S. Pat. No. 4,760,566 to Kobayashi et al. for a Method of Controlling Write Operation for Rotating Type Recording Medium; U.S. Pat. No. 4,831,611 to Sasaki et al. for an Optical Writing and Reading Method and Apparatus; and U.S. Pat. No. 5,023,854 to Satoh et al. for a Disc Having a Data Read-Only Area and a Data Recording Arm and a Recording Reproducing System Therefor.

The Miura et al. patent discloses a method by which a determination is made concerning the preexistence of data on a track prior to recording information on that track. In essence, Miura et al. use different tracks to determine if data exists in any part of a track and thereafter prevents writing to any track which indicates the presence of preexisting data. Kobayashi et al. disclose a process by which data can be overwritten with or without pre-erasing depending upon the existence of the flag field associated with each block. Sasaki et al. disclose a similar approach wherein overwriting is prevented by writing on a mark recording region. Thereafter overwriting is inhibited. The Satoh et al. patent discloses a read-only type optical disk and related disk drive divided into read-only and read/write areas recorded in the respective identifier portions. This prevents writing to the read-only areas.

Generally such systems transfer data to optical disks in two steps. Data is generated on magnetic disk storage systems. When the data is fixed, it then transfers to the optical disk. This involves multiple transfers.

U.S. Pat. No. 5,233,576 (1993) to Curtis et al. discloses a multi-functional optical disk drive and media using a magneto-optical disk media that can operate as a read/write storage media or as a WORM media and can eliminate transfers from a magnetic disk storage device to an optical disk. The apparatus and methodology disclosed in the Curtis et al. patent is directed to providing a read/write apparatus that has the same level of security as a WORM device. In the apparatus, a media descripter table is contained within a control track. The media also includes a storage state bit within each sector of each track of the media. This storage state bit defines whether the sector is writable or read-only. When the bit is set into the writable state, the sector can be written many times (i.e., operates in a read/write mode). Once the bit is changed to read-only, the sector can no longer be written and cannot be reset to a read/write state. Curtis et al. disclose two locations for each storage bit, namely: (1) the sector mark field area of each sector or (2) the data field area of each sector.

In typical data processing systems, optical disks are stored in changers that must mount each optical disk as it is required. The time required to write optical disks and even to read data from those disks can be up to an order of magnitude longer than corresponding times that characterize magnetic disk storage media. By virtue of the fact that a typical read-only disk can be used only once, once the data on the disk becomes obsolete the optical disk cannot be used again. All these characteristics can increase the "per byte" storage costs beyond the per byte storage costs for magnetic disk storage media.

The Curtis et al. patent does disclose a system that overcomes certain problems. For example, the system disclosed in the Curtis et al. patent eliminates the step of transferring from magnetic media to optical media. However the Curtis et al. patent writing operations require an analysis of data on the optical disk. That is, writing operations to read-only areas produce error messages that are determined only after the retrieval of status resident on the storage media. Such operations, that occur after delays in the millisecond range, can seriously affect system performance. Consequently the general approach has continued to be writing the data to a magnetic storage media and then, upon the data becoming stable, transferring that data to an optical disk.

SUMMARY

Therefore it is an object of this invention to provide a magnetic disk storage media with the characteristics of an optical disk.

Another object of this invention is to provide a magnetic disk storage media that can be controlled to provide a write-once function.

Still another object of this invention is to provide magnetic disk storage with the permanent storage characteristics of an optical disk while retaining the reading and writing speeds inherent in a magnetic disk storage media.

In accordance with this invention, read/write storage media operates in a data processing system in which writing operations transfer data to a system cache memory for staging to the storage media. At least one group of contiguous storage locations is defined to have the capability of switching between a read/write mode and a write-once, read-many times-mode. A correspondence is defined in the system cache memory of each of the storage locations in the group and establishes the modes. The status retained in the system cache memory enables the determination of the storage mode. When the read-only mode exists, the writing operation is blocked; otherwise a conventional writing operation occurs.

In accordance with another aspect of this invention, a method is provided for enabling at least one track of storage locations in a magnetic disk storage device to operate in a selected one of read-only or read-write operating modes. The magnetic disk storage device operates in a system including a system cache memory for receiving writing requests from a central processor, temporarily storing the writing request and corresponding data and transferring the corresponding data from the system cache memory to at least one track on the magnetic disk storage device. The method comprises the steps of (1) defining a correspondence in the system cache memory that identifies each track having the capability of operating in the two modes, (2) defining, for each identified track in the correspondence, one of the read-only and read-write operating modes, and (3) enabling the system to transfer data from the system cache memory to one of the identified tracks only when the correspondence in the system cache memory specifies that the identified track is operating in a read-write mode.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
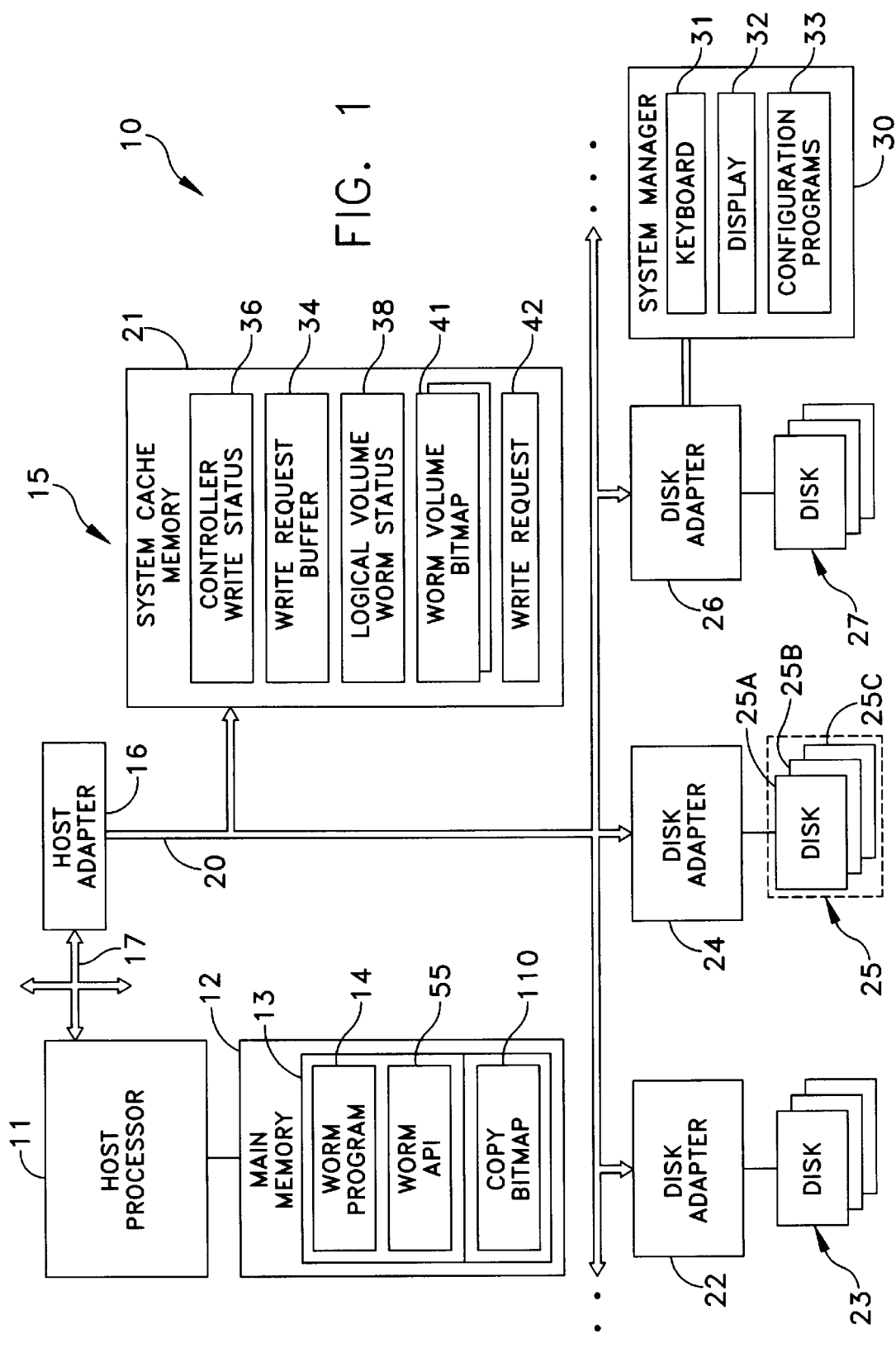
FIG. 1 is a block diagram of a data processing system adapted to incorporate this invention.

FIG. 1 depicts elements of a data processing system 10 that are necessary for an understanding of this invention. In one embodiment the data processing system 10 includes a host processor 11 that can comprise one or more central processors. In an IBM-based system operating under MVS, for example, the host processor 11 can comprise up to ten central processors. The host processor 11 operates with a main memory 12 that is divided into a number of sections as known in the art. Certain sections, known as user space, contain user applications programs. For purposes of this invention an application program 13 includes a WORM program 14 that is relevant to an understanding of this invention.

The remainder of the circuitry represents a disk subsystem 15. The disk subsystem 15 is also known as a controller. This invention is particularly adapted for use with a Symmetrix 5000 disk subsystem or controller that includes a number of direct access storage devices. More particularly, FIG. 1 depicts a host adapter 16 that typically connects to a bus or channel 17 to the host processor 11. The host adapter 16 is also called a channel adapter. All communications to and from the host processor 11 and the controller 15 occur through the host adapter 16.

The host adapter 16 establishes communications between the channel 17 and an internal bus 20 that connects to a system cache memory 21 and to the magnetic storage media. In this particular embodiment the bus 20 connects to a first block of storage media comprising a disk adapter 22 and a physical disk 23, to a disk adapter 24 and a physical disk 25, and to a disk adapter 26 and a physical disk 27. Each of the physical disks 23, 25 and 27 is depicted as having multiple components in the form of logical volumes. The physical disks may also comprise multiple disk drives. For purposes of this invention, however, it would be helpful to consider each physical disk, such as the physical disk 25, being organized into logical volumes designated as logical volumes 25A, 25B and 25C in FIG. 1. A logical volume may reside in part of a physical disk drive or in multiple disk drives. Logical volumes need not have any particular size. Each logical volume constitutes a user defined storage space on the magnetic disk media.

Configuration and controller management are provided by a system manager 30 with a keyboard 31 and display 32. The system manager 30 can comprise a conventional programmable computer connected to one of the disk adapters, such as the disk adapter 26, to establish communications with all portions of the controller 15. As known, system administrators use the system manager 30 to configure the various disks 23, 25 and 27 and establish the configuration of and provide control over the operations of the various components in the controller 15.

During normal operations, read requests from the host processor 11 are received in the host adapter 16. If data satisfying the read request is present in the system cache memory 21, the data is immediately transferred back to the host processor 11 through the host adapter 16. If the data is not present, control programs in the system cache memory 21 (not shown but known in the art) obtain the requested data from a corresponding physical disk drive or logical volume, transfer that data to the system cache memory 21 and then transfer the data from the system cache memory 21 through the host adapter 16 to the host processor 11.

When the host processor issues a write request, the data transfers to a write request buffer 34 shown in FIG. 1. Thereafter the control program destages the data by transferring it from the system cache memory 21 to an appropriate logical volume.

In the specific implementation of the Symmetrix series 5000 disk subsystems logical volumes are stored on one or more tracks. In the following discussion the operation of this invention is discussed in terms of a granularity of one track. It will become apparent that other granularities, such as sector, cylinder or like granularities, could be utilized in place of the selected track granularity.

During an initial configuration process, a configuration program 33 in the system manager 30 configures one or more logical volumes to have a capability by which individual tracks can be switched between read/write and read-only operating modes. In step 35 of FIG. 2 the system manager 30 identifies a controller 15 as a WORM controller. That is, the system manager 30 designates the entire controller 15 to have the WORM capability. In this embodiment the data processing system 10 addresses logical volumes, so step 37 in FIG. 2 identifies those logical volumes that will serve as WORM volumes. For example, logical volume 25A could be identified in the physical disk 25 while logical volumes 25B and 25C would not be designated to have that capability. The selection of the particular volumes will be dependent upon the application that is involved. This information is stored in a logical volume buffer 38 shown in FIG. 1. Stated differently the logical volume buffer 38 will identify each logical volume which has the capability of operating in a WORM mode.

Figure 2:
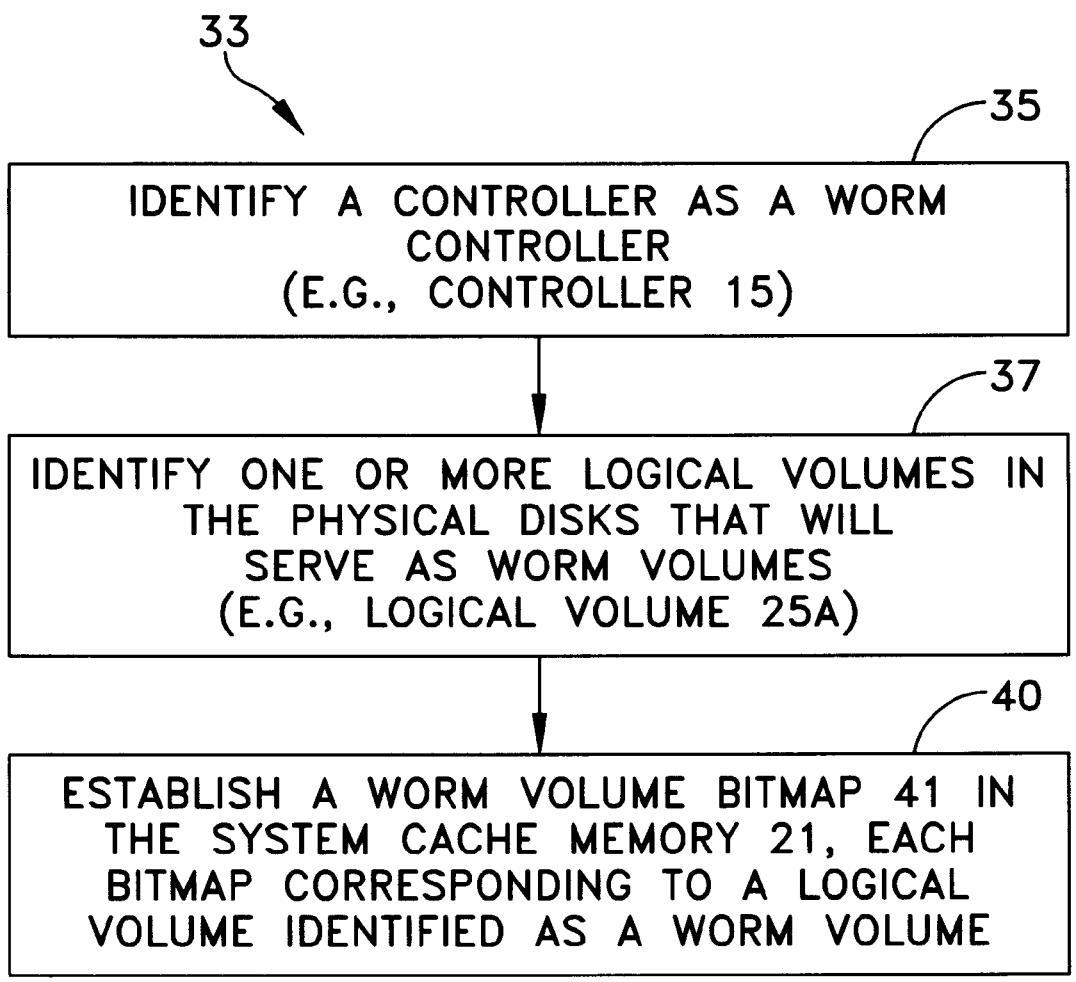
FIG. 2 is a flow chart of the process by which a portion of a disk in FIG. 1 is identified to have the characteristics of this invention.

Step 40 in FIG. 2 establishes a WORM volume bit map 41 in the system cache memory for each logical volume identified as a WORM volume. The WORM volume bit map 41 will contain one bit position for each logical track in the volume. At each bit position it is assumed that a "1" and "0" will establish read-only and read/write capabilities for the track respectively. The bit map is organized by 16-bit words, each bit defining the status of one of 15 tracks with one bit being undefined. This provides a compressed bit map for identifying tracks that are operating in a read-only or read/write mode on a track-by-track basis.

The configuration program sets the value in each bit position to a "0" so each track initially will operate in the read/write mode. Alternatively the state of each bit may be indefinite to be set through the WORM program 14 shown in FIG. 1 and described later. In either case, the configuration process of FIG. 2 also establishes space in the system cache memory 21 for storing the controller and logical volume WORM status in blocks 36 and 38 and the WORM volume bit maps 41.

Assuming that, after the configuration program 33 in FIG. 2 is completed, all the track bit positions in designated logical volumes establish the read/write operating mode for each track, normal writing operations occur. As specifically shown in FIG. 3, a write request program 42 in the system cache memory 12 of FIG. 1 operates after the host processor 11 issues an IO request in step 43 and the host adapter receives that IO IO request in step 44. The write request program 42 examines the IO request to determine if it is a write request. If it is not, step 45 branches to step 46 whereupon the designated operation, such as a read operation, is performed.

If the IO request is a write request, control branches from step 45 to step 47. In step 47 the write request program 42 determines whether the logical volume to receive the data is a WORM volume. If it is not, as, for example, if the write request were to designate a track in logical volume 25B, control passes to step 50 to perform a normal writing operation. If, however, the logical volume is a WORM volume, such as the logical volume 25A, control branches to step 51. Step 51 identifies the track to receive the data and retrieves the information from the corresponding one of the WORM volume bit maps 41. Step 52 then determines whether the track is operating in the read-only or read/write mode. If the mode is read/write, control transfers to step 50 whereupon the standard write operation occurs. Otherwise control passes to step 53 which stops processing and sends an error message back to the host processor 11 indicating an invalid command.

Figure 3:
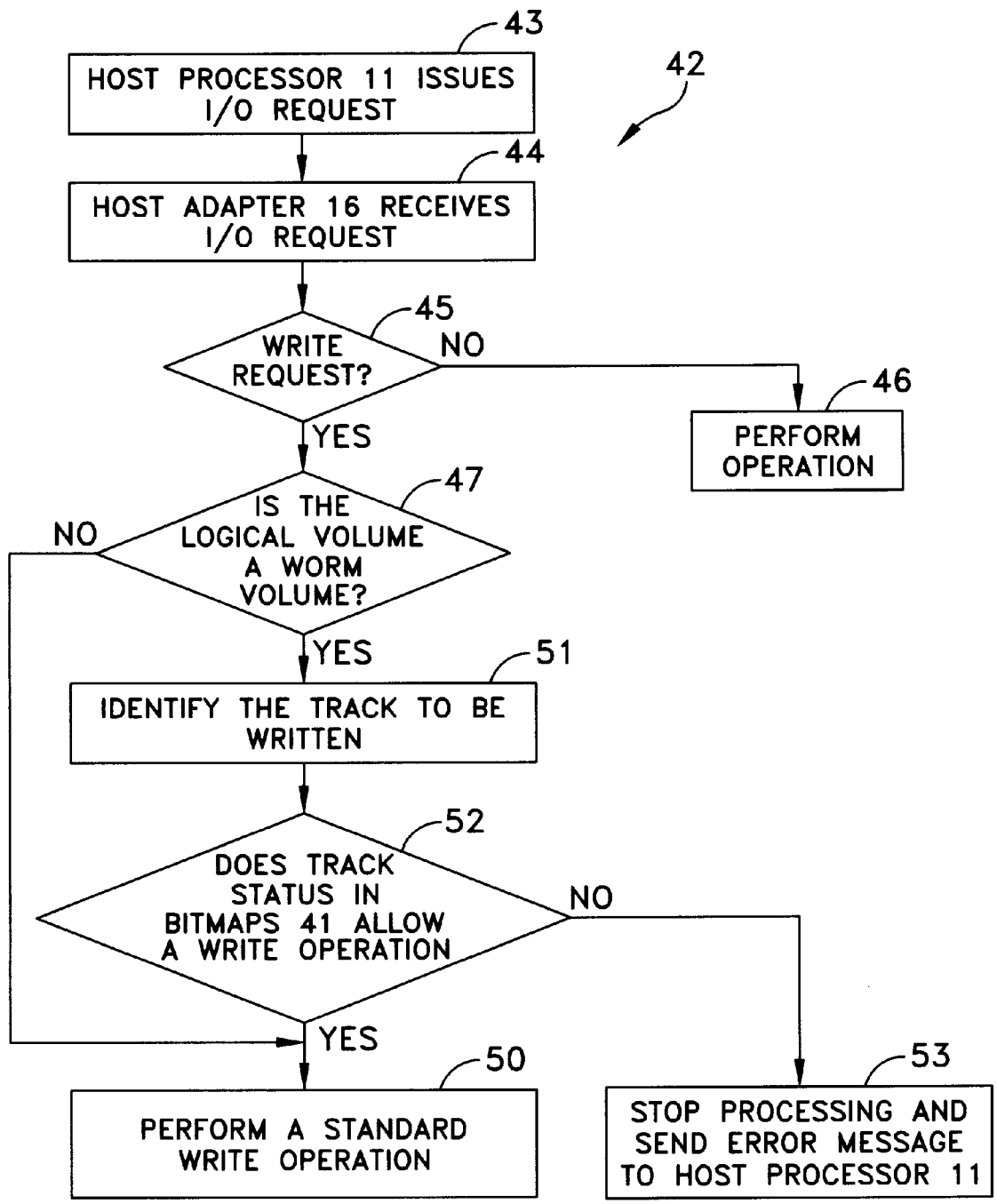
FIG. 3 is a flow diagram that discloses the response of the system in FIG. 1 to a writing operation to a disk having the characteristics of this invention.

All this processing is done in the system cache memory 21. There is no requirement to actually test data at the physical disk drive such as the physical disk drive 25. Consequently, the decision made by the tests in FIG. 3 are completed in the order of a few microseconds.

As will now be apparent, information in the WORM volume bit maps 41 controls the capabilities of the system. Specifically normal writing operations can occur to a track so long as the corresponding bit position identifies the track as operating in the read/write mode. Once the corresponding bit position is shifted to designate the read-only operating mode, it is not possible to write additional data to that track unless and until the corresponding bit position is shifted to designate the read/write operating mode.

Figure 4A:
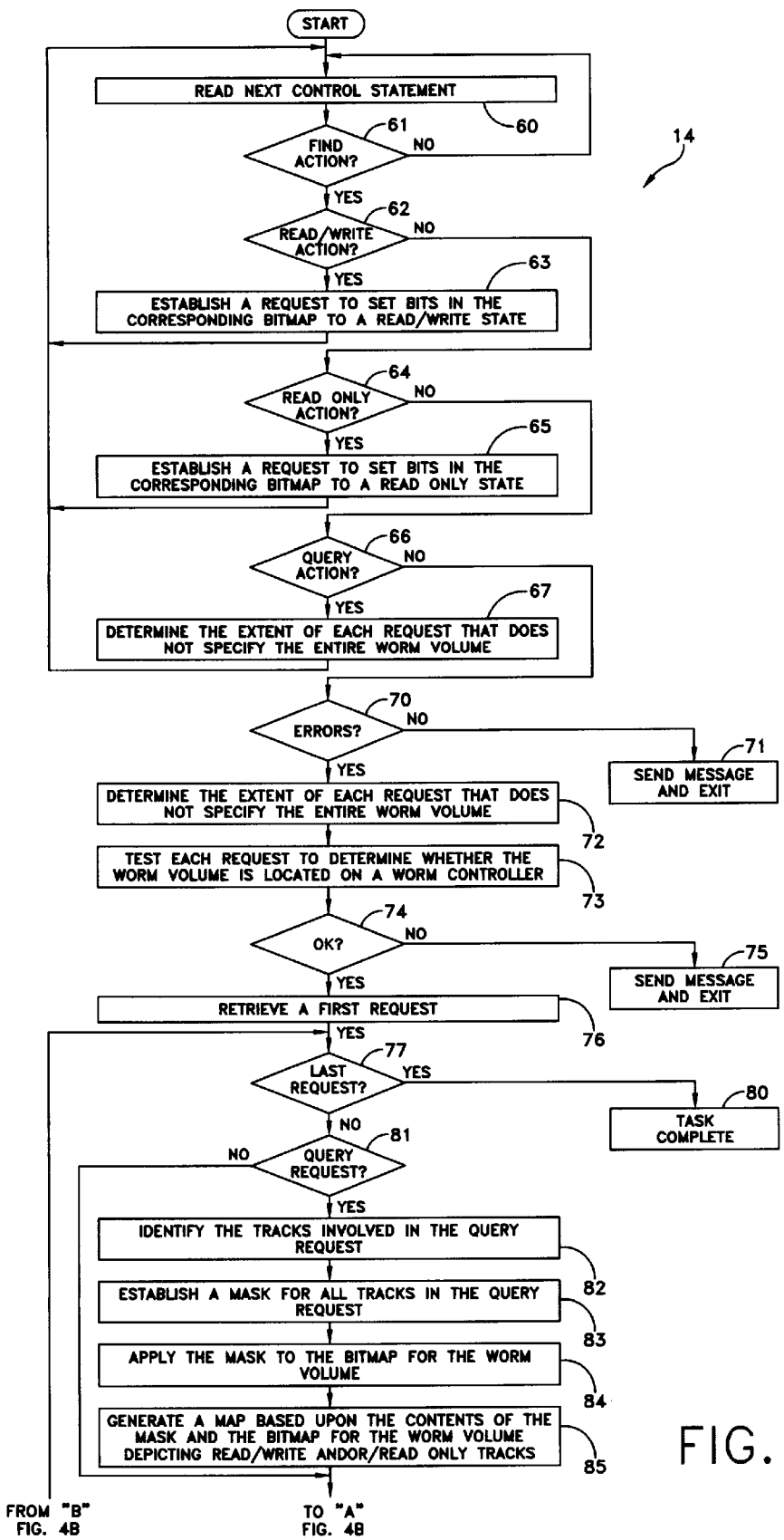
FIGS. 4A and 4B constitute a flow diagram of one embodiment of a process by which the characteristic of a disk constructed in accordance with this invention can be altered.
Figure 4B:
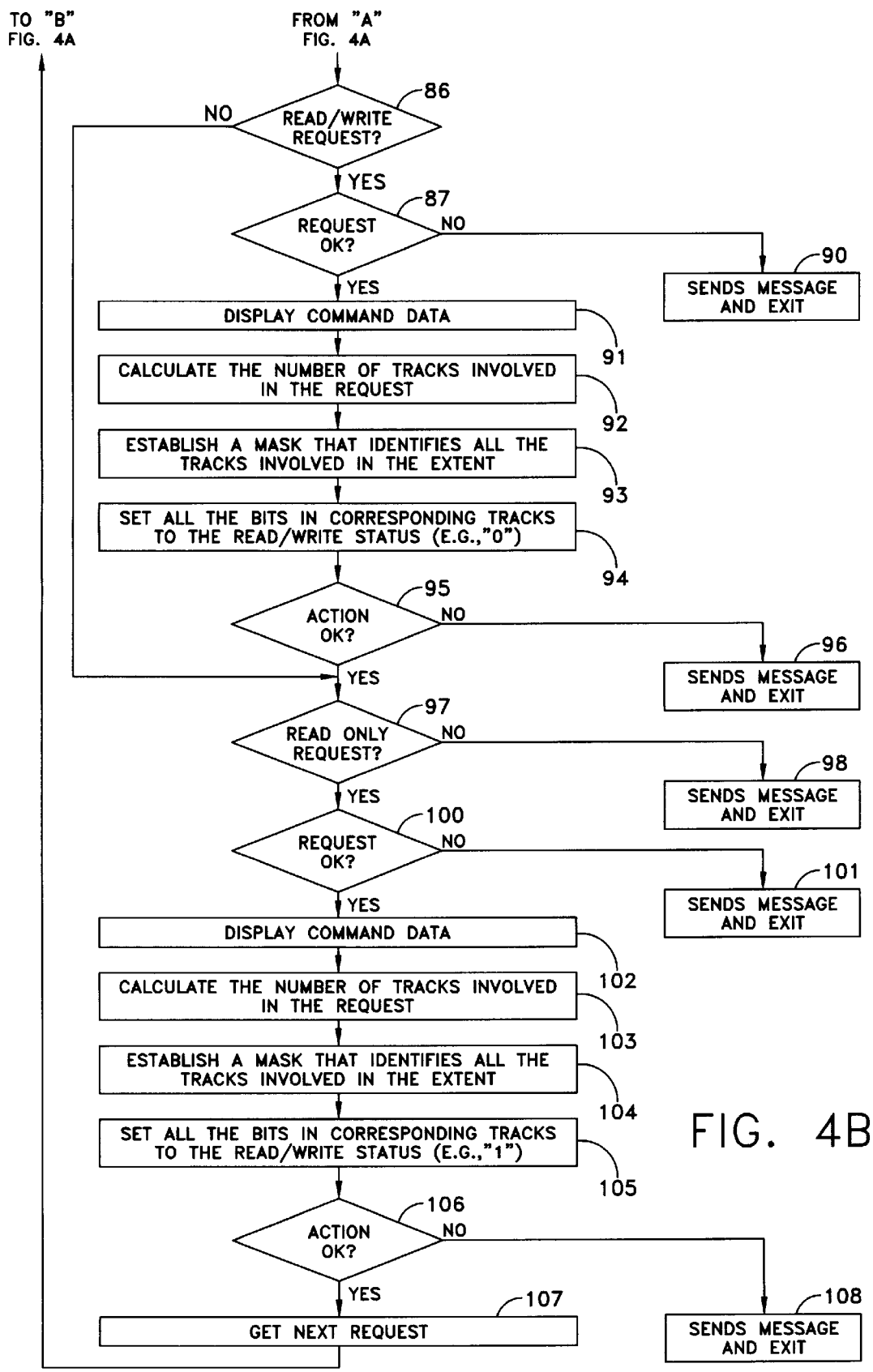

A number of procedures can be implemented to manage the status defined by the WORM volume bit maps 41. FIGS. 4A and 4B depict one such approach that constitutes the WORM program 14 in FIG. 1. A WORM API (application programming interface) 55 enables an authorized program to initiate the WORM program 14 whereby the authorized program controls the values in the WORM volume bit maps 41. This enables the authorized program to designate either the read/write or read-only operating mode obtain the status of different tracks for management purposes. By operating this program with password or other authorization safeguards, it is possible to operate the disk subsystem 15 with portions of the magnetic media having a read-only capability, even though the data is stored on a memory with inherent read/write capabilities.

Alternatively, the system administrator will generate, through the host processor 11 and main memory 12, a series of control statements to which the WORM program 13 will respond. These control statements include an action field and an address field. Two of the actions will be a R/O action to establish a read-only operating mode and a R/W action to establish a read/write operating mode. The set of actions typically also will include a QUERY action for retrieving the contents of the WORM volume bitmap or 41. The address portion of the statement can identify the tracks that are subject to the action. These addresses can take several forms, such as the address of a logical volume, a data set name or a range of cylinder and track addresses. In the following discussion the tracks to be subjected to an action are called the "extent", notwithstanding the method by which the limits of the extent are defined.

A given operation of the WORM program 14 can respond to one or more action control statements received from the system administrator or received through the WORM API 55. Step 60 in FIG. 4A represents the process by which the host processor 11 reads each control statement in sequence once the WORM program 14 is initiated. In response the WORM program 14 builds a series of requests for the various actions. Specifically each time the WORM program 14 finds an action statement step 61 diverts to step 62. If, in step 62, the control statement identifies the process of setting particular bits to a read/write state (i.e., a R/W action), step 63 establishes a request to clear those bits (i.e., establish a "0" in each corresponding bit position). Control then transfers back to step 60 to read the next control statement.

If the action is not a R/W action, control passes from step 62 to step 64 to determine if the action is a R/O action. If this occurs control branches to step 65 to establish a request to set the bits in the corresponding bit map to a read-only state (i.e., to establish a "1" in each corresponding bit position). Control again transfers back to step 60.

If the action is a QUERY action, control passes to step 66 to enable step 67 to establish a request to read bits in the corresponding one of the WORM bit maps 41 for returning control to step 60.

If an action is not for a read/write, read-only or QUERY action, step 70 transfers control to step 71 whereupon an appropriate message is generated back to the system administrator and the WORM program 13 terminates.

Steps 62, 64 and 66 constitute a decoding structure and could take other forms. In whatever form, once each action is decoded and the corresponding request is established, control transfers from step 70 to step 72. Step 72 examines the address field in each action statement to determine the extent of each request that does not specify the entire WORM volume. Each request is then tested to determine whether it is an action for a WORM volume located on a WORM controller. If it is not, control passes from step 74 to step 75 that generates an appropriate message to the system administrator and terminates the WORM program 14.

When the request is to a WORM volume, such as a request to the logical volume 25A in FIG. 1, the WORM program 14 continues by retrieving a first one of the requests generated in steps 63, 65 and 67. This occurs in step 76. Step 76 then transfers control to a loop that step 77 monitors. When the last request has been processed, the task is complete and control transfers to step 80. However, with the first and all subsequent requests, control passes from step 77 to step 81 that is the first step in a decoding and processing loop. If the request was generated in step 67, it is a QUERY request and step 81 transfers control to step 82 that identifies the tracks involved in the QUERY request extent. Step 83 establishes a bit mask for all the tracks in the QUERY request extent. That mask is then applied for the portion of the WORM volume bit maps 41 corresponding to the extent to generate, in step 85, a report that identifies each of the requested tracks and their respective states as designating read/write or read-only operating modes depending upon the concordance of the mask and the individual bits. For example, the generated map could be the logical "AND" of the mask and the corresponding portions of WORM volume bit maps 41.

If the WORM program 14 decodes a read/write request in step 86, control passes to step 87 to test syntax. If any error exists, control passes to step 90 whereupon the WORM program 14 generates an appropriate message for the system administrator and terminates the program. Valid read/write requests 86 are processed in a series of steps beginning with step 91 that displays the command data for the administrator. Step 92 calculates the number of tracks involved in the request and step 93 establishes a mask that identifies all the tracks involved in the extent. Step 94 then combines the mask in step 93 and the corresponding bits in the WORM volume bit maps 41 such that all the identified tracks have their corresponding bit positions set to "0". If the foregoing steps are completed without error, step 95 transfers control to step 97. Otherwise step 95 transfers control to step 96 that sends an appropriate message to the system administrator and terminates the program.

When a request is a read-only request, control passes to step 97. Step 98 sends a message to the system administrator and exits if a request is not a read-only request. Essentially, steps 81, 86 and 97 define the only valid requests that the WORM program 14 processes. If the request does not fall within one of these categories, an error exists.

When a read-only request is received, control transfers to step 100 that tests the syntax and generates a message for the system administrator and exits in step 101 if a syntax error exists. If the syntax is appropriate, step 102 displays command data. Steps 103 calculates the extent while step 104 establishes a mask that identifies all the tracks involved in the extent. The system then sets all the corresponding tracks to the read-only status (e.g. a "1"). If the action performs satisfactorily step 106 diverts to step 107 to get a next request and return control to step 77 in FIG. 4A. Otherwise step 106 in FIG. 4B transfers control to step 108 to send a message to the system administrator and terminate the program because an error has occurred.

As previously stated a logical volume, such as the logical volume 25A, is initiated with all tracks operating in the read/write operating mode. That is, insurance policy or medical records will be processed and transferred to the logical volume 25A to be edited. Once the system administrator or a user is assured that a certain number of tracks have data that is stable, the system administrator executes a job with the R/O action defining the extent. Alternatively the user runs a corresponding application program. The WORM program 14 responds to either situation by altering the WORM volume bit maps 41 in FIG. 1 so all the tracks in the action extent are set to a read-only state. Immediately, and without further intervention, changes to those tracks are blocked. To assure a proper operation, the system administrator or user can issue a QUERY action to assure the appropriate change from the read/write operating mode to the read-only operating mode.

Read/write requests can be utilized in at least three situations. First, after the configuration program of FIG. 2 is run the system administrator could run the WORM program 14 in FIG. 1 with R/W actions to establish each track in each WORM volume as a read/write track. If a QUERY action should indicate the incorrect shift of a track to a read-only track, the R/W action could be utilized to correct that mistake. Second, after some interval of time, the data in a logical volume will be stale; that is, it will relate to expired medical records or insurance policies. When that occurs, the system administrator or user can, with appropriate procedural safeguards, use a R/W action to reestablish a set of tracks as having a read/write operating mode and then make the space available to the system for use for storing other records. A third example is the use of the R/W action to establish a known initial value in each map bit position.

The second use of the WORM program 14 further enhances the operation of the system by assuring that tracks are not transferred to a read-only operating mode until those tracks are completely filled. Partially filled tracks can remain in a read/write operating mode until such time as they are filled and thereafter be transferred to a read-only operating mode.

As another alternative, the writing operation of FIG. 3 can be modified such that step 50 in FIG. 3 is a subroutine called either by step 47 or step 52. However, in the event step 52 calls the subroutine, the write program would be modified to be sure that each track to which data is written is identified and then a subsequent step would transfer each of the corresponding bit positions in the WORM volume bit map 41 to a read-only state. This approach has the advantage of immediately transferring data to a read-only state upon a first writing operation. However, even though a writing operation may partially fill a track, the entire track shifts to a read-only state. Unused space then exists thereby decreasing the efficiency with which the magnetic storage media store the data.

FIG. 1 also depicts a copy bit map program 110 located in the main memory 12. This can be part of a suite of programs that operate whenever system power is lost. Such programs, commonly referred to as "power down programs", are well known in the art. The specific copy bit program 110 would identify each of the WORM volume bit maps 41 in FIG. 1 and transfer those bit maps to the corresponding logical volumes. The logical volumes generally will be configured with a dedicated area for the bit maps during the configuration process of FIG. 2. Copying the WORM volume bit maps 41 to their corresponding logical volumes could also be performed on a scheduled or arbitrary basis.

In summary, there has been disclosed a method for enabling magnetic storage media to operate with the capability of a read-only memory. In this particular implementation all writing operations are tested in a system cache memory to determine whether a particular track is characterized by a read-only or read/write operating mode. There is no requirement for the system to interrogate data contained in any of the disk adapters or on the disk itself. Consequently the capability is implemented with a minimal amount of overhead.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for enabling the selection of at least one group of storage locations in a read/write magnetic disk storage media to operate in a selected one of read-only or read/write operating modes wherein the read/write storage media operates in a system magnetic disk storage system including the storage media and a system cache memory for staging and destaging input-output requests including a writing request for transferring data from a central processor the storage media, said method comprising the steps of:

A) defining a correspondence in the system cache memory that identifies each storage location group in the magnetic disk storage system having the capability of operating in the two modes, B) defining, for each storage location group in the correspondence, one of the read-only and read/write operating modes, C) enabling a writing request to alter data in an identified storage location group only when the correspondence in the cache memory specifies that the storage location in the identified group is operating in a read/write mode.

2. A method as recited in claim 1 wherein said method additionally includes the step of altering the definition of an operating mode in the correspondence.

3. A method as recited in claim 2 wherein said step of altering includes:

i) generating a mask for each storage location group that is to operate in the read-only operating mode, and ii) transferring the mask to the correspondence thereby to control the operating mode of each storage location group having the capability of operating in the two modes.

4. A method as recited in claim 2 wherein said altering includes responding to a writing operation to a storage location group by changing the operating mode for the corresponding storage location group to a read-only mode.

5. A method as recited in claim 2 wherein said step of altering includes:

i) generating a mask to identify each storage location group that is to operate in the read/write operating mode, and ii) transferring the mask to the correspondence thereby to control the operating mode of each storage location group having the capability of operating in the two modes.

6. A method as recited in claim 2 wherein the magnetic disk storage system includes a correspondence storage location and said method comprises the step of copying the correspondence in the system cache memory to the correspondence storage location in the magnetic disk storage system.

7. A method as recited in claim 6 wherein said copying is performed periodically.

8. A method as recited in claim 6 wherein the system includes means for monitoring power thereto and said copying is performed in response to a loss of power.

9. A method as recited in claim 1 additionally comprising the steps of:

i) determining the operating mode of the storage location group identified by a write request from the correspondence in the system cache memory, and ii) generating an error message each time the correspondence in the system cache identifies the storage location group as characterized by a read-only operating mode.

10. A method for enabling at least one track of storage locations in a magnetic disk storage device to operate in a selected one of read-only or read/write operating modes wherein the magnetic disk storage device operates in a system and includes magnetic disk storage media containing the tracks of storage locations and a device cache memory for receiving writing requests from a central processor and for temporarily storing the writing request and corresponding data and transferring the corresponding data from the device cache memory to at least one track on the magnetic disk storage device, said method comprising the steps of A) defining a correspondence in the device cache memory that identifies each track having the capability of operating in the two modes, B) defining, for each track identification in the correspondence, one of the read-only and read/write operating modes, C) enabling the magnetic disk storage device to transfer data from the device cache memory to a selected track only when the corresponding track identification in the correspondence in the device cache memory specifies that the selected track is operating in a read/write mode.

11. A method as recited in claim 10 wherein said method additionally includes the step of altering an operating mode in the correspondence.

12. A method as recited in claim 11 wherein said step of altering includes:

i) generating a mask with a bit position assigned to each track that is to operate in the read-only operating mode, and ii) transferring the mask to the correspondence thereby to control the operating mode of each track.

13. A method as recited in claim 11 wherein said altering includes responding to a writing operation to a track by changing the operating mode for the corresponding track identification to a read-only mode.

14. A method as recited in claim 11 wherein said step of altering includes:

i) generating a mask with a bit position for each track to be transferred to the read/write operating mode, and ii) transferring the mask to the correspondence thereby to control the operating mode of each track.

15. A method as recited in claim 11 wherein the magnetic disk storage device includes a correspondence storage location and said method comprises the step of copying the correspondence in the device cache memory to the correspondence storage location.

16. A method as recited in claim 15 wherein said copying is performed periodically.

17. A method as recited in claim 15 wherein the system includes means for monitoring power thereto and said copying is performed in response to a loss of power.

18. A method as recited in claim 10 additionally comprising the steps of:

i) determining the operating mode of the track identified by a write request from the correspondence in the device cache memory, and ii) generating an error message each time the correspondence in the device cache identifies the track as characterized by a read-only operating mode.

* * * * *